United States Patent
Kim et al.

(10) Patent No.: US 11,773,796 B2
(45) Date of Patent: Oct. 3, 2023

(54) METHOD AND DEVICE FOR MAINTAINING TEMPERATURE OF AFTERTREATMENT SYSTEM OF VEHICLE

(71) Applicants: Hyundai Motor Company, Seoul (KR); Kia Corporation, Seoul (KR)

(72) Inventors: Juhyun Kim, Hwaseong (KR); Jaeseok Shin, Hwaseong (KR); Jinhan Lee, Siheung (KR)

(73) Assignees: HYUNDAI MOTOR COMPANY, Seoul (KR); KIA CORPORATION, Seoul (KR)

( * ) Notice: Subject to any disclaimer, the term of this patent is extended or adjusted under 35 U.S.C. 154(b) by 0 days.

(21) Appl. No.: 17/903,334

(22) Filed: Sep. 6, 2022

(65) Prior Publication Data

US 2023/0175448 A1    Jun. 8, 2023

(30) Foreign Application Priority Data

Dec. 6, 2021    (KR) .......... 10-2021-0172851

(51) Int. Cl.
*F02D 41/00* (2006.01)
*F02D 13/04* (2006.01)

(52) U.S. Cl.
CPC ........... *F02D 41/0055* (2013.01); *F02D 13/04* (2013.01); *F02D 41/0007* (2013.01); *F02D 2200/0802* (2013.01); *F02D 2200/50* (2013.01)

(58) Field of Classification Search
CPC ... F02D 13/04; F02D 41/0055; F02D 41/0007; F02D 41/024; F02D 41/042; F02D 9/06; F02D 2200/0802; F02D 2200/50; F02D 2250/18
See application file for complete search history.

(56) References Cited

U.S. PATENT DOCUMENTS

| | | | |
|---|---|---|---|
| 6,512,971 B2* | 1/2003 | Koumura et al. .... | F16H 61/143 477/154 |
| 10,605,159 B2* | 3/2020 | Kurtz ...................... | F01B 7/14 |
| 2012/0065826 A1* | 3/2012 | Kinoshita et al. ...... | B60K 6/365 903/906 |
| 2013/0144473 A1* | 6/2013 | Jeong et al. .......... | B60W 10/06 701/99 |
| 2016/0332631 A1 | 11/2016 | Roos et al. | |

FOREIGN PATENT DOCUMENTS

KR    10-1960874 B1    7/2019

* cited by examiner

*Primary Examiner* — Audrey B. Walter
*Assistant Examiner* — Dapinder Singh
(74) *Attorney, Agent, or Firm* — MORGAN, LEWIS & BOCKIUS LLP

(57) ABSTRACT

A method of maintaining a temperature of an aftertreatment system of a vehicle, the method including: operating, by a controller, a retarder reducing driving force of a propeller shaft of the vehicle in response to a retarder operation request signal; operating, by the controller, a jake brake device which discharges a fuel-air mixture compressed in an explosion stroke of the engine to an exhaust pipe and decreases revolutions per minute (RPM) of the engine or an exhaust brake device which blocks a discharge of the exhaust gas of the engine to a rear end of the exhaust pipe and decreases the RPM of the engine, in order to remove the output error value; and controlling, by the controller, the engine so that an amount of exhaust gas introduced into the aftertreatment system is decreased.

18 Claims, 2 Drawing Sheets

METHOD AND DEVICE FOR MAINTAINING TEMPERATURE OF AFTERTREATMENT SYSTEM OF VEHICLE

CROSS-REFERENCE TO RELATED APPLICATION

This application claims priority to and the benefit of Korean Patent Application No. 10-2021-0172851 filed in the Korean Intellectual Property Office on Dec. 6, 2021, the entire contents of which are incorporated herein by reference.

TECHNICAL FIELD

The present disclosure relates to a vehicle, and more particularly, to a method and a device for maintaining a temperature of an aftertreatment system of a vehicle.

BACKGROUND

Harmful components contained in vehicle exhaust gas are unburned hydrocarbons (HC), carbon monoxide (CO), and nitrogen oxides (NOx) generated by high-temperature combustion.

Since all vehicles driven by gasoline engines or diesel engines emit exhaust gas containing these harmful components, and the number of vehicles is increasing year by year, governments in many countries around the world strictly regulate the amount of emission, and fuel efficiency standards are also being strengthened. Therefore, a device for suppressing the generation of these harmful substances or purifying these harmful substances is essential for all vehicles.

Vehicle catalysts are called three-way catalysts because they oxidize CO and HC to change the oxidized CO and HC to carbon dioxide and water, and at the same time reduce NOx into harmless nitrogen and oxygen. A post-treatment catalyst for purifying vehicle exhaust gas is a porous honeycomb coated with an oxide and a noble metal, which are catalyst components, and a representative method of preparing such a coating layer is a wash coating method.

The catalyst purifies various harmful substances, such as HC, CO, or NOx, contained in the exhaust gas of a vehicle, and another example of the catalyst may be composed of a mixed material of ceria ($CeO_2$) and zirconia ($ZrO_2$).

An exhaust gas purification system using a three-way catalyst is commonly used to convert harmful substances (CO, HC, and NOX) emitted from an engine into harmless substances ($CO_2$, $H_2O$, and $N_2$).

The above information disclosed in this Background section is only for enhancement of understanding of the background of the disclosure, and therefore it may contain information that does not form the related art that is already known in this country to a person of ordinary skill in the art.

SUMMARY

The present disclosure has been made in an effort to provide a method and a device for maintaining a temperature of an aftertreatment system of a vehicle, which are capable of maintaining a temperature of a catalyst of an aftertreatment system by controlling an engine when braking of a vehicle is performed by a retarder.

An exemplary embodiment of the present disclosure provides a method of maintaining a temperature of an aftertreatment system of a vehicle, the method including: when a road on which a vehicle travels is downhill, operating, by a controller, a retarder to reduce driving force of a propeller shaft of the vehicle in response to a retarder operation request signal; when an output error value of the retarder is equal to or smaller than a reference error value, operating, by the controller, a jake brake device, which discharges a fuel-air mixture compressed in an explosion stroke of an engine to an exhaust pipe and decreases revolutions per minute (RPM) of the engine, or an exhaust brake device, which blocks a discharge of the exhaust gas of the engine to a rear end of the exhaust pipe and decreases the RPM of the engine, in order to remove the output error value; and in order to maintain a temperature of the aftertreatment system, controlling, by the controller, the engine so that an amount of the exhaust gas, of which a temperature is lowered due to the operation of the jake brake device or the exhaust brake device, introduced into the aftertreatment system is decreased.

The method may further include determining, by the controller, whether the road on which the vehicle travels is downhill based on an output signal of a tilt angle sensor detecting a tilt angle of the vehicle.

The method may further include determining, by the controller, whether the output error value of the retarder exceeds the reference error value based on an output signal of an operation detection sensor detecting an output value of the retarder.

The controlling of the engine may include decreasing, by the controller, an amount of air introduced to the engine by controlling a throttle valve of the engine that adjusts the amount of air supplied to the engine.

The controlling of the engine may include changing, by the controller, a discharge path of the exhaust gas so that a turbocharger of the engine is not operated by the exhaust gas of which the temperature has been lowered due to the operation of the jake brake device or the exhaust brake device.

The controlling of the engine may include introducing, by the controller, the exhaust gas of which the temperature has been lowered due to the operation of the jake brake device or the exhaust brake device into a combustion chamber of the engine by opening an Exhaust Gas Recirculation (EGR) valve of the engine.

The controlling of the engine may include, after the exhaust brake device is operated, decreasing, by the controller, the amount of the exhaust gas, of which the temperature has been lowered due to the operation of the jake brake device or the exhaust brake device, introduced into the aftertreatment system by closing a valve of the exhaust brake device.

The controlling of the engine may include increasing the temperature of the exhaust gas, of which the temperature has been lowered due to the operation of the jake brake device or the exhaust brake device, by operating a device of the engine which injects heated fuel into an oxidation catalyst of the aftertreatment system.

The controlling of the engine may include discharging, by the controller, the exhaust gas, of which the temperature has been lowered due to the operation of the jake brake device or the exhaust brake device, to an outside of the vehicle by opening a valve of a bypass passage of the engine installed in the exhaust pipe including a selective catalytic reduction of the aftertreatment system.

Another exemplary embodiment of the present disclosure provides a device for maintaining a temperature of an aftertreatment system of a vehicle, the device including: a retarder which reduces driving force of a propeller shaft of the vehicle; and a controller, which operates the retarder in response to a retarder operation request signal by a driver of the vehicle when a road on which the vehicle travels is downhill, in which an output error value of the retarder is equal to or smaller than a reference error value, the controller operates a jake brake device, which discharges a fuel-air mixture compressed in an explosion stroke of the engine to an exhaust pipe and decreases revolutions per minute (RPM) of the engine, or an exhaust brake device, which blocks a discharge of the exhaust gas of the engine to a rear end of the exhaust pipe and decreases the RPM of the engine, in order to remove the output error value; and in order to maintain a temperature of the aftertreatment system of the engine, the controller controls the engine so that an amount of the exhaust gas, of which a temperature is lowered due to the operation of the jake brake device or the exhaust brake device, introduced into the aftertreatment system is decreased.

The controller may determine whether the road on which the vehicle travels is downhill based on an output signal of a tilt angle sensor detecting a tilt angle of the vehicle.

The controller may determine whether the output error value of the retarder exceeds the reference error value based on an output signal of an operation detection sensor detecting an output value of the retarder.

The controller may decrease an amount of air introduced to the engine by controlling a throttle valve of the engine that adjusts the amount of air supplied to the engine, so that the amount of the exhaust gas, of which the temperature has been lowered due to the operation of the jake brake device or the exhaust brake device, introduced into the aftertreatment system is decreased.

The controller may change a discharge path of the exhaust gas so that a turbocharger of the engine is not operated by the exhaust gas of which the temperature has been lowered due to the operation of the jake brake device or the exhaust brake device, so that the amount of the exhaust gas, of which the temperature has been lowered due to the operation of the jake brake device or the exhaust brake device, introduced into the aftertreatment system is decreased.

The controller may introduce the exhaust gas, of which the temperature has been lowered due to the operation of the jake brake device or the exhaust brake device, into a combustion chamber of the engine by opening an Exhaust Gas Recirculation (EGR) valve of the engine, so that the amount of the exhaust gas, of which the temperature has been lowered due to the operation of the jake brake device or the exhaust brake device, introduced into the aftertreatment system is decreased.

After the exhaust brake device is operated, the controller may decrease the amount of the exhaust gas, of which the temperature has been lowered due to the operation of the jake brake device or the exhaust brake device, introduced into the aftertreatment system by closing a valve of the exhaust brake device.

The controller may increase the temperature of the exhaust gas, of which the temperature has been lowered due to the operation of the jake brake device or the exhaust brake device, by operating a device of the engine which injects fuel into an oxidation catalyst of the aftertreatment system, so that the amount of exhaust gas, of which the temperature has been lowered due to the operation of the jake brake device or the exhaust brake device, introduced into the aftertreatment system is decreased.

The controller may discharge the exhaust gas, of which the temperature has been lowered due to the operation of the jake brake device or the exhaust brake device to an outside of the vehicle, by opening a valve of a bypass passage of the engine installed in the exhaust pipe including a selective catalytic reduction of the aftertreatment system, so that the amount of the exhaust gas, of which the temperature has been lowered due to the operation of the jake brake device or the exhaust brake device, introduced into the aftertreatment system is decreased.

The method and the device for maintaining a temperature of an aftertreatment system of a vehicle according to the exemplary embodiments of the present disclosure may maintain a temperature of catalyst of an aftertreatment system by controlling an engine when braking of a vehicle is performed by a retarder. Therefore, purification efficiency of a catalyst is not degraded, so that the aftertreatment system may be normally operated.

BRIEF DESCRIPTION OF THE DRAWINGS

In order to facilitate understanding of the drawings used in the detailed description of the present disclosure, a brief description of each drawing is provided.

DETAILED DESCRIPTION OF THE EMBODIMENTS

Figure 1:
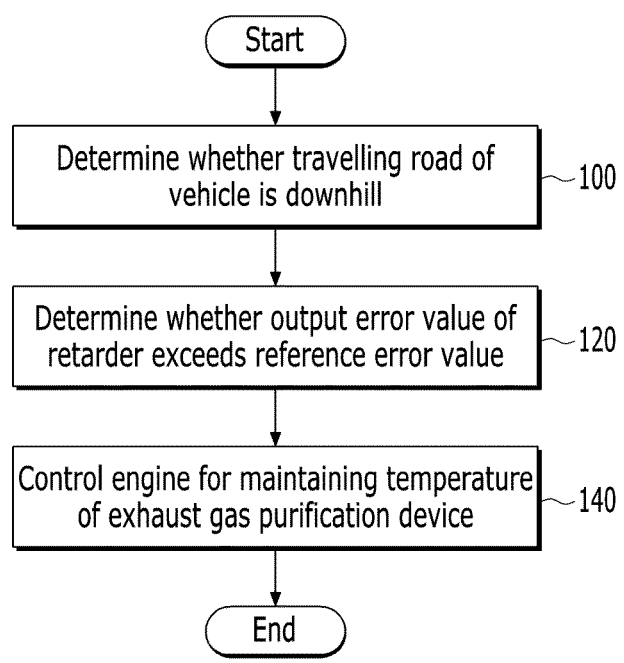
FIG. 1 is a flowchart illustrating a method of maintaining a temperature of an aftertreatment system of a vehicle according to an exemplary embodiment of the present disclosure.

In order to fully understand the present disclosure and the object achieved by the implementation of the present disclosure, reference should be made to the accompanying drawings illustrating the exemplary embodiment of the present disclosure and the contents described in the accompanying drawings.

Hereinafter, the present disclosure will be described in detail by describing the exemplary embodiment of the present disclosure with reference to the accompanying drawings. In the following description of the exemplary embodiment, a detailed description of known configurations or functions incorporated herein will be omitted when it is judged that the detailed description may make the subject matter of the present disclosure unclear. Like reference numerals presented in each drawing designate like elements throughout the specification.

The term used in the present specification is simply used for describing a specific embodiment and does not intend to limit the present disclosure. A singular expression includes a plural expression unless it is specifically described to the contrary in the context. In the present specification, it should be appreciated that terms "including" and "having" are intended to designate the existence of characteristics, numbers, steps, operations, constituent elements, and components described in the specification or a combination thereof, and do not exclude a possibility of the existence or addition of one or more other characteristics, numbers, steps, operations, constituent elements, and components, or a combination thereof in advance.

Throughout this specification, when it is described that an element is "coupled" to another element, the element may be "directly coupled" to the another element or "electrically or mechanically coupled" to the another element a still another element interposed therebetween.

All terms used herein including technical or scientific terms have the same meanings as meanings which are generally understood by those skilled in the art to which the present disclosure pertains unless they are differently defined. Terms defined in generally used dictionary shall be construed to have meanings matching those in the context of a related art, and shall not be construed as ideal or excessively formal meanings unless they are clearly defined in the present application.

Exhaust gas emitted from combustion of fuel in a vehicle's engine contains harmful substances, such as sulfur oxides (SOx), particulate matter (PM), or nitrogen oxides (NOx), and in a vehicle, various catalysts are installed in an aftertreatment system to reduce the emission of these harmful substances. Among catalysts, selective catalytic reduction (SCR) reduces nitrogen oxides (NOx) in exhaust gas when the temperature of the catalyst is about 250° C. or higher.

Commercial vehicles, such as buses, use auxiliary brakes (for example, exhaust brakes) when going downhill. When the auxiliary brake is used, there is no combustion of fuel in the vehicle's engine, so the temperature of the exhaust gas is lowered. The low-temperature exhaust gas is sent to the aftertreatment system to lower the temperature of the catalyst of the aftertreatment system. Then, the selective catalytic reduction (SCR) of the aftertreatment system does not purify nitrogen oxides (NOx) and nitrogen oxides (NOx) are emitted to the atmosphere (or to the outside of the vehicle).

Figure 2:
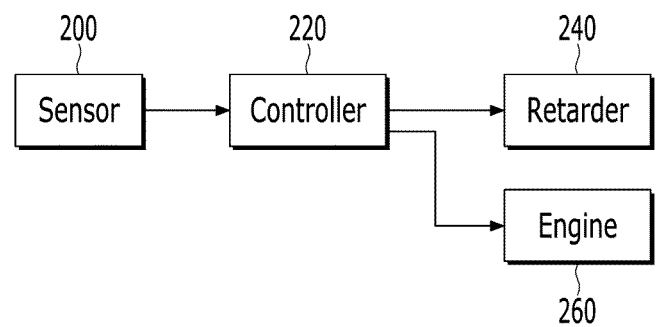
FIG. 2 is a block diagram illustrating a device for maintaining a temperature of an aftertreatment system of a vehicle to which the method of maintaining a temperature of an aftertreatment system of a vehicle illustrated in FIG. 1 is applied.

FIG. 1 is a flowchart illustrating a method of maintaining a temperature of an aftertreatment system of a vehicle according to an exemplary embodiment of the present disclosure. FIG. 2 is a block diagram illustrating a device for maintaining a temperature of an aftertreatment system of a vehicle to which the method of maintaining a temperature of an aftertreatment system of a vehicle illustrated in FIG. 1 is applied.

Referring to FIGS. 1 and 2, in a determination operation 100, a controller 220 may determine whether a road on which a vehicle travels is downhill based on an output signal of a tilt angle sensor which is included in a sensor 200 and detects a tilt angle of the vehicle (for example, the commercial vehicle).

The controller 220 is an Electronic Control Unit (ECU), and may control a general operation of the vehicle including a device for maintaining a temperature of an aftertreatment system (or an exhaust gas purification device) of a vehicle. For example, the controller 220 may be one or more microprocessors operated by a program (control logic) or hardware (for example, a microcomputer) including the microprocessor, and the program may include a series of instructions for performing a method of maintaining a temperature of an aftertreatment system of a vehicle according to an exemplary embodiment of the present disclosure. The instruction may be stored in a memory of the device for maintaining a temperature of an aftertreatment system of a vehicle or the controller 220. The controller 220 may include an Engine Control Unit (ECU) for controlling an engine 260, and a Transmission Control unit (TCU) controlling a transmission of the vehicle.

The device for maintaining a temperature of an aftertreatment system of a vehicle may include a sensor (or a data detector) 200, the controller 220, a retarder (or a retarder brake) 240 controlled by the TCU, and the engine 260, such as a diesel engine.

The sensor 200 may include a tilt angle sensor (or an acceleration sensor which detects an acceleration of the vehicle and detects a tilt angle of the vehicle), which detects a tilt angle of the vehicle and provides the detected tilt angle to the controller 220, an operation detection sensor which detects an output value (or an actual output value) of the retarder 240 and provides the detected output value to the controller 220, and a temperature sensor which detects a temperature of the aftertreatment system of the vehicle (or an aftertreatment system of the engine 260) and provides the detected temperature to the controller 220.

The aftertreatment system (or an exhaust gas aftertreatment system) is a device for purifying pollutants, such as nitrogen oxides (NOx), hydrocarbons (HC), carbon monoxide (CO), or methane ($CH_4$), in exhaust gas discharged from the engine 260, and may include an oxidation catalyst (OC, oxidation catalyst) and a selective catalytic reduction (SCR) positioned in an exhaust pipe that is a passage through which the exhaust gas discharged from the engine passes. The oxidation catalyst (for example, diesel oxidation catalyst) faciliates oxidation of a carbon compound, such as hydrocarbon (HC), carbon monoxide (CO), or methane ($CH_4$), in the exhaust gas to reduce the concentration of carbon compounds, such as hydrocarbons, carbon monoxide, or methane, in the exhaust gas. The selective catalytic reduction may reduce the concentration of nitrogen oxides in the exhaust gas by facilitating reduction of nitrogen oxides ($NO_x$) in the exhaust gas.

When it is determined that the road on which the vehicle travels is downhill, the controller 220 may operate the retarder 240 in response to a retarder operation request signal by a driver of the vehicle. For example, the retarder 240 may include a fluid-type retarder using coolant. The fluid-type retarder is an auxiliary brake which is installed between the transmission of the vehicle and a propeller shaft of the vehicle to decelerate the vehicle by reducing driving force of the propeller shaft, and may include a stator and a rotor.

According to an operation 120, the controller 220 may determine whether an output error value of the retarder exceeds a reference error value based on an output signal of the operation detection sensor that detects an output value of the retarder 240. The reference error value for maintaining a temperature of a catalyst of the aftertreatment system may be determined by a test (or experiment).

The output error value of the retarder 240 may be a value obtained by subtracting the output value of the retarder from an output target value of the retarder. The output error value of the retarder 240 may be varied according to a temperature of the coolant for operating the retarder. For example, when the temperature of the coolant exceeds a reference temperature, the output error value of the retarder 240 may be generated.

When it is determined that the output error value of the retarder 240 exceeds the reference error value, the controller 220 may brake the vehicle by operating a jake brake device or an exhaust brake device for removing the output error value.

According to an operation 140, when it is determined that the output error value of the retarder 240 is equal to or smaller than the reference error value, the controller 220 may operate a jake brake device or an exhaust brake device for removing the output error value.

In order to maintain the temperature of the aftertreatment system purifying exhaust gas of the engine 260, the controller 220 may control the engine 260 so that the amount of exhaust gas, of which the temperature has been lowered due to the operation of the jake brake device or the exhaust brake device, introduced to the aftertreatment system is decreased (for example, minimized). When the jake brake device or the exhaust brake device is operated, the combustion of fuel disappears in the engine 260 (or a combustion chamber of the engine), so that the temperature of the exhaust gas may be lowered. In the exemplary embodiment of the present disclosure, the amount (flow rate) of exhaust gas, of which the temperature is lowered, introduced to the aftertreatment system is decreased, so that the aftertreatment system may be normally operated without degradation of catalyst purification efficiency of the aftertreatment system.

The jake brake device may be an auxiliary brake for discharging a fuel-air mixture compressed in an explosion stroke of the engine 260 to the exhaust pipe and decreasing the revolutions per minute (RPM) of the engine. The jake brake device may include an exhaust valve of the engine opened in the explosion stroke of the engine 260.

The exhaust brake device may be a brake device for decreasing the RPM of the engine by blocking the discharge or the flow of the exhaust gas of the engine 260 to a rear end of the exhaust pipe. The exhaust brake device may be an auxiliary brake assisting a foot brake that is the main brake device. The exhaust brake device may include a valve.

In another exemplary embodiment of the present disclosure, the controller 220 may decrease the amount of air introduced into the engine (or the combustion chamber of the engine) by controlling (for example, partially closing) a throttle valve of the engine that adjusts the amount of air supplied to the engine 260. Accordingly, the amount of exhaust gas of which the temperature has been lowered due to the operation of the jake brake device or the exhaust brake device is decreased, so that the amount of exhaust gas introduced into the aftertreatment system may be decreased.

In another exemplary embodiment of the present disclosure, the controller 220 may change a discharge path of the exhaust gas by controlling the valve of the exhaust pipe so that a turbocharger of the engine 260 is not operated by the exhaust gas of which the temperature has been lowered due to the operation of the jake brake device or the exhaust brake device. Accordingly, thermal energy of the exhaust gas of which the temperature has been lowered due to the operation of the jake brake device or the exhaust brake device is maintained, so that the amount of exhaust gas, of which the temperature is lowered, introduced into the aftertreatment system may be decreased.

In another exemplary embodiment of the present disclosure, the controller 220 may introduce the exhaust gas of which the temperature has been lowered due to the operation of the jake brake device or the exhaust brake device into the combustion chamber of the engine by opening an Exhaust Gas Recirculation (EGR) valve of the engine 260. The EGR valve may be connected between an exhaust manifold of the engine 260 and an intake manifold of the engine. Therefore, the amount of exhaust gas, of which the temperature is lowered, introduced into the aftertreatment system may be decreased.

In another exemplary embodiment of the present disclosure, after the exhaust brake device is operated, the controller 220 may decrease the amount of exhaust gas, of which the temperature has been lowered due to the operation of the jake brake device or the exhaust brake device, introduced into the aftertreatment system by closing the valve of the exhaust brake device.

In another exemplary embodiment of the present disclosure, the controller 220 increase the temperature of the exhaust gas, of which the temperature has been lowered due to the operation of the jake brake device or the exhaust brake device, through the oxidation reaction of fuel by operating a Hydrocarbon Injection (HCl) device of the engine 260 that injects (introduces) fuel (for example, light oil) heated to a relatively high temperature into (to) an oxidation catalyst of the aftertreatment system. Accordingly, the temperature of the aftertreatment system may be maintained.

In another exemplary embodiment of the present disclosure, the controller 220 may discharge the exhaust gas, of which the temperature has been lowered due to the operation of the jake brake device or the exhaust brake device, to the outside of the vehicle by opening a valve of a bypass passage of the engine 260 installed in the exhaust pipe including the selective catalytic reduction of the aftertreatment system. Accordingly, the temperature of the aftertreatment system may be maintained. When the jake brake device or the exhaust brake device is operated, the fuel is not injected into the engine, so that the exhaust gas, of which the temperature has been lowered due to the operation of the jake brake device or the exhaust brake device, does not contain a nitrogen oxide ($NO_x$).

The constituent element, "- unit", a block, or a module used in the exemplary embodiment of the present disclosure may be implemented by software, such as a task, class, subroutine, process, object, execution thread, and program performed in a predetermined area of a memory, or hardware, such as field-programmable gate array (FPGA) or an application-specific integrated circuit (ASIC), and may also be implemented by a combination of the software and the hardware. The constituent element, "- unit" or the like may also be included in a computer readable storage medium, and a part thereof may be distributed in the plurality of computers.

As described above, the exemplary embodiments have been disclosed in the drawings and the specification. The specific terms are used herein, but are only used for the purpose of describing the present disclosure, and are not used to limit the meaning orthe scope of the present disclosure described in the claims. Accordingly, those skilled in the art will appreciate that various modifications and equivalent embodiments may be made without departing from the scope and spirit of the present disclosure. Therefore, the true technical protection scope of the present invention will be defined by the technical spirit of the accompanying claims.

What is claimed is:

1. A method of maintaining a temperature of an aftertreatment system of a vehicle, the method comprising:
   in response to a road on which a vehicle travels is downhill, operating, by a controller, a retarder to reduce driving force of a propeller shaft of the vehicle in response to a retarder operation request signal;
   in response to an output error value of the retarder is equal to or smaller than a reference error value, operating, by the controller, a jake brake device, which discharges a fuel-air mixture compressed in an explosion stroke of an engine to an exhaust pipe and decreases revolutions per minute (RPM) of the engine, or an exhaust brake device, which blocks a discharge of an exhaust gas of the engine to a rear end of the exhaust pipe and decreases the RPM of the engine, in order to remove the output error value; and
   in order to maintain a temperature of the aftertreatment system, controlling, by the controller, the engine so that an amount of the exhaust gas, of which a temperature is lowered due to the operation of the jake brake device or the exhaust brake device, introduced into the aftertreatment system is decreased.

2. The method of claim 1, further comprising:
   determining, by the controller, whether the road on which the vehicle travels is downhill based on an output signal of a tilt angle sensor detecting a tilt angle of the vehicle.

3. The method of claim 1, further comprising:

determining, by the controller, whether the output error value of the retarder exceeds the reference error value based on an output signal of an operation detection sensor detecting an output value of the retarder.

4. The method of claim 1, wherein
the controlling of the engine includes
decreasing, by the controller, an amount of air introduced to the engine by controlling a throttle valve of the engine that adjusts the amount of air supplied to the engine.

5. The method of claim 1, wherein:
the controlling of the engine includes
changing, by the controller, a discharge path of the exhaust gas so that a turbocharger of the engine is not operated by the exhaust gas of which the temperature has been lowered due to the operation of the jake brake device or the exhaust brake device.

6. The method of claim 1, wherein:
the controlling of the engine includes
introducing, by the controller, the exhaust gas of which the temperature has been lowered due to the operation of the jake brake device or the exhaust brake device into a combustion chamber of the engine by opening an Exhaust Gas Recirculation (EGR) valve of the engine.

7. The method of claim 1, wherein
the controlling of the engine includes
after the exhaust brake device is operated, decreasing, by the controller, the amount of the exhaust gas, of which the temperature has been lowered due to the operation of the jake brake device or the exhaust brake device, introduced into the aftertreatment system by closing a valve of the exhaust brake device.

8. The method of claim 1, wherein:
the controlling of the engine includes
increasing, by the controller, the temperature of the exhaust gas, of which the temperature has been lowered due to the operation of the jake brake device or the exhaust brake device, by operating a device of the engine which injects fuel into an oxidation catalyst of the aftertreatment system.

9. The method of claim 1, wherein:
the controlling of the engine includes
discharging, by the controller, the exhaust gas, of which the temperature has been lowered due to the operation of the jake brake device or the exhaust brake device, to an outside of the vehicle by opening a valve of a bypass passage of the engine installed in the exhaust pipe including a selective catalytic reduction of the aftertreatment system.

10. A device for maintaining a temperature of an aftertreatment system of a vehicle, the device comprising:
a retarder which reduces driving force of a propeller shaft of the vehicle; and
a controller, which is configured to operate the retarder in response to a retarder operation request signal by a driver of the vehicle when a road on which the vehicle travels is downhill, wherein:
when an output error value of the retarder is equal to or smaller than a reference error value, the controller is further configured to operate a jake brake device, which discharges a fuel-air mixture compressed in an explosion stroke of an engine to an exhaust pipe and decreases revolutions per minute (RPM) of the engine, or an exhaust brake device, which blocks a discharge of an exhaust gas of the engine to a rear end of the exhaust pipe and decreases the RPM of the engine, in order to remove the output error value; and
in order to maintain a temperature of the aftertreatment system of the engine, the controller is further configured to control the engine so that an amount of the exhaust gas, of which a temperature is lowered due to the operation of the jake brake device or the exhaust brake device, introduced into the aftertreatment system is decreased.

11. The device of claim 10, wherein:
the controller is further configured to determine whether the road on which the vehicle travels is downhill based on an output signal of a tilt angle sensor detecting a tilt angle of the vehicle.

12. The device of claim 10, wherein:
the controller is further configured to determine whether the output error value of the retarder exceeds the reference error value based on an output signal of an operation detection sensor detecting an output value of the retarder.

13. The device of claim 10, wherein:
the controller is further configured to decrease an amount of air introduced to the engine by controlling a throttle valve of the engine that adjusts the amount of air supplied to the engine, so that the amount of the exhaust gas, of which the temperature has been lowered due to the operation of the jake brake device or the exhaust brake device, introduced into the aftertreatment system is decreased.

14. The device of claim 10, wherein:
the controller is further configured to change a discharge path of the exhaust gas so that a turbocharger of the engine is not operated by the exhaust gas of which the temperature has been lowered due to the operation of the jake brake device or the exhaust brake device, so that the amount of the exhaust gas, of which the temperature has been lowered due to the operation of the jake brake device or the exhaust brake device, introduced into the aftertreatment system is decreased.

15. The device of claim 10, wherein:
the controller is further configured to introduce the exhaust gas, of which the temperature has been lowered due to the operation of the jake brake device or the exhaust brake device, into a combustion chamber of the engine by opening an Exhaust Gas Recirculation (EGR) valve of the engine, so that the amount of the exhaust gas, of which the temperature has been lowered due to the operation of the jake brake device or the exhaust brake device, introduced into the aftertreatment system is decreased.

16. The device of claim 10, wherein:
after the exhaust brake device is operated, the controller is further configured to decrease the amount of the exhaust gas, of which the temperature has been lowered due to the operation of the jake brake device or the exhaust brake device, introduced into the aftertreatment system by closing a valve of the exhaust brake device.

17. The device of claim 10, wherein:
the controller is further configured to increase the temperature of the exhaust gas, of which the temperature has been lowered due to the operation of the jake brake device or the exhaust brake device, by operating a device of the engine which injects fuel into an oxidation catalyst of the aftertreatment system, so that the amount of the exhaust gas, of which the temperature has been lowered due to the operation of the jake brake device or the exhaust brake device, introduced into the aftertreatment system is decreased.

18. The device of claim 10, wherein:
the controller is further configured to discharge the exhaust gas, of which the temperature has been lowered due to the operation of the jake brake device or the exhaust brake device to an outside of the vehicle, by opening a valve of a bypass passage of the engine installed in the exhaust pipe including a selective catalytic reduction of the aftertreatment system, so that the amount of the exhaust gas, of which the temperature has been lowered due to the operation of the jake brake device or the exhaust brake device, introduced into the aftertreatment system is decreased.

* * * * *